United States Patent
Lee (10) Patent No.: US 8,153,249 B2
(45) Date of Patent: Apr. 10, 2012

(54) ARTICLE TREATED WITH SILICA PARTICLES AND METHOD FOR TREATING A SURFACE OF THE ARTICLE

(75) Inventor: Jin-Kyu Lee, Seoul (KR)

(73) Assignee: SNU R&DB Foundation, Seoul (KR)

( * ) Notice: Subject to any disclaimer, the term of this patent is extended or adjusted under 35 U.S.C. 154(b) by 384 days.

(21) Appl. No.: 12/198,790

(22) Filed: Aug. 26, 2008

(65) Prior Publication Data

US 2010/0055451 A1    Mar. 4, 2010

(51) Int. Cl.
*B32B 5/16* (2006.01)
(52) U.S. Cl. .................. 428/331; 428/323; 428/446
(58) Field of Classification Search .............. 428/323, 428/331, 446
See application file for complete search history.

(56) References Cited

U.S. PATENT DOCUMENTS

| | | | |
|---|---|---|---|
| 4,780,356 A * | 10/1988 | Otouma et al. | 428/32.37 |
| 5,906,888 A | 5/1999 | Hart | |
| 6,228,480 B1 * | 5/2001 | Kimura et al. | 428/328 |
| 6,777,069 B2 | 8/2004 | Ito et al. | |

OTHER PUBLICATIONS

Kanta et al., Fabrication of silica-on-titania and titania-on-silica nanoparticle assemblies, *Colloids and Surfaces A: Physicochem. Eng. Aspects* (2007) 292:1-7.

* cited by examiner

*Primary Examiner* — Gwendolyn Blackwell
(74) *Attorney, Agent, or Firm* — Knobbe, Martens, Olson & Bear, LLP (57) ABSTRACT

An article including a substrate, and a base layer formed on a surface of the substrate, and methods for treating the surface of the substrate are provided.

20 Claims, 5 Drawing Sheets

ARTICLE TREATED WITH SILICA PARTICLES AND METHOD FOR TREATING A SURFACE OF THE ARTICLE

BACKGROUND

Various surface treatment processes which confer desired characteristics to the surface of a substrate have been suggested. Many of these surface treatment processes were developed to provide corrosion resistance, lubricity, or a foundation for subsequent coatings or painting. For example, a surface of a substrate may be pre-treated prior to applying a coating layer (e.g., paint layer, lacquer layer, etc.) in order to improve not only the adhesive property between the surface and the coating layer, but also protection from severe and harmful elements.

$SiO_2$ coating using conventional sol-gel processes is a widely used method for treating surfaces of substrates. However, applying a silica coating using conventional coating methods provides insufficient adhesion because of the inadequately generated surface roughness or surface area. Phosphating is another widely used surface treatment method. However, one drawback to the conventional phosphating process is that it changes the chemical composition of the surface of the substrate due to the involvement of acidic agents. Another drawback is that the conventional phosphating process is only applicable to limited types of metals.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the components of the present disclosure, as generally described herein, and illustrated in the Figures, may be arranged, substituted, combined, and designed in a wide variety of different configurations, all of which are explicitly contemplated and make part of this disclosure.

In one embodiment, an article may include a substrate, such as, by way of example and not a limitation, a solid substrate, and a base layer formed on a surface of the substrate, of which the base layer includes silica particles.

In another embodiment, a method for treating a surface of a substrate may include:

coating a surface of a substrate with the dispersion liquid containing silica particles; and drying the substrate coated with the dispersion liquid to form a base layer on the surface of the substrate.

In various embodiments, an average size of silica particle may be about 1 µm or less. In other embodiments, the average size may be about 20 nm to about 1 µm. In still other embodiments, the average size may be about 20 nm to about 500 nm, or about 20 nm to about 250 nm in yet other embodiments. In some embodiments, if nanoparticle has a shape other than a sphere, a size of each particle may be defined by a diameter of a circumscribed sphere.

A size of silica particles may be uniform or not (i.e. different or irregular). In one embodiment, silica particles with uniform size may include that about 95% or more of the total particles have sizes of about 40% to about 160% of an average particle size, when measured through an electron microscope analysis. In other embodiment, silica particles with different sizes may include that less than about 95% of the total particles have sizes of about 40% to about 160% of the average particle size, when measured through an electron microscope analysis. In some embodiments, a base layer including the silica particles with different sizes may be formed in order to increase a contacting area with an additional coating layer. In other embodiment, silica particles with different sizes may be formed intentionally in a preparing process, or obtained by mixing two or more silica particles groups with uniform size.

The shape of silica particles may include a specific shape such as a sphere, a cylinder, a polygon, a plate, etc., however, claimed subject matter is not limited in this regard. In other embodiment, a shape of silica particles may include an irregular shape. In some embodiments, a surface of particles may be rough rather than smooth in order to increase adhesiveness.

In one embodiment, the silica particles may be porous particles having a relatively large surface area. In some embodiments, the diameter of the pores may be about 50 nm or less, in some implementations a diameter may be from about 1 nm to about 25 nm, in other implementations diameters may be from about 2 nm to about 10 nm. In other embodiments, a specific surface area of porous particles may be from about 200 m²/g to about 3000 m²/g.

Silica particles may include a variety of other substances in addition to $SiO_2$. In some examples, silica particles may include metal elements (such as Ti, Zr, Hf, V, Nb, Ta, Cr, Mo, W, Mn, Re, Fe, Ru, Os, Co, Rh, Ir, Ni, Pd, Pt, Cu, Ag, Au, Zn, Cd, Hg, Mg, Ca, Sr, Ba, Sc, Y, Ga, In, Tl, Si, Ge, Sn, Pb, As, Sb, Bi, etc.), alloys including at least two metal elements, metal oxides (such as $Y_2O_3$, $CeO_2$, $Dy_2O_3$, $Er_2O_3$, $Eu_2O_3$, $Gd_2O_3$, $Ho_2O_3$, $La_2O_3$, $Lu_2O_3$, $Nd_2O_3$, $Pr_6O_{11}$, $Sm_2O_3$, $Tb_2O_3$, $Th_4O_7$, $Tm_2O_3$, $Yb_2O_3$, MgO, $TiO_2$, $Cr_2O_3$, CuO, SrO, $LiO_2$, NiO, $Fe_2O_3$, $ZrO_2$, $Al_2O_3$, $Sb_2O_5$, $Y_2O_3$, ZnO, $SnO_2$, $As_2O_3$, $B_2O_3$, $GeO_2$, $P_2O_5$, $TeO_2$, $V_2O_5$, etc.), metal salts (such as metal sulfides, metal nitrate, etc.), organic compounds, or combinations thereof. Thus, the "silica particle"

used herein may mean not only a pure $SiO_2$, but also a particle including any other substances in addition to $SiO_2$.

Silica particles may be prepared using known methods such as sol-gel synthesis (e.g. Stober process), seeded growth, precipitation, hydrothermal process, thermochemical synthesis (in other words spray conversion), chemical vapor deposition, mechanical cruching, milling, etc, however, claimed subject matter is not limited in this regard.

In some embodiments, a sol-gel synthesis may prepare particles having various shape and sizes with a high degree of purity. In an illustrative embodiment, a catalyst (e.g. ammonia ($NH_3$)) may be dissolved in a mixture of water and alcohol as a solvent. Then, $SiO_2$ precursor may be dissolved in said solution to obtain spherical silica particles by hydrolysis and polycondensation.

Examples of $SiO_2$ precursor may include silicon alkoxide, silicon halide, silicon salt, etc., however, claimed subject matter is not limited in this regard. In some examples, silicon alkoxide may be represented by formula (I) as follows:

$$Si(OR^1)_4 \qquad (I)$$

of which $R^1$ is an alkyl group, alkenyl group or aromatic group having 1 to 6 carbon atoms, non-substituted or substituted with halogen atom.

Alcohol may be used as a cosolvent, since silicon alkoxide may not mix well with water. Various alcohols may be employed and claimed subject matter is not limited to specific solvents. Examples of suitable alcohols may include methanol, ethanol, propanol, buthanol, pentanol, etc. In some embodiments alcohol may be used alone, also in other embodiments, a mixture of two or more alcohols may be used. In an illustrative embodiment, water may participate hydrolysis and polycondensation. In other embodiment, acidic or basic solution may be used as a catalyst.

A variety of factors may affect a size and/or a shape of particles in a preparation of the particles. In some examples, the factors may include a pH level of the solution, a type and amount of catalyst, a type and a number of substitution of precursor (steric and inductive effect, etc.), amount of water, a type of solvent, concentration of starting material, temperature, treatments and types of acid and base which may be used optionally, etc. In some embodiments, a pH level of a solution may be important, and a basic solution may be used in order to prepare a sol of a particle shape like powder. In light of the present disclosure, a skilled person in the art would easily select a pH and a type of catalyst for obtaining silica particles with desired size and shape.

In some embodiments, silica particles may be obtained from $SiO_2$ particles such as fumed silica, fused silica, sand, silica sol, silica gel, silicate minerals (e.g. talc), sodium silicate, or minerals by a mechanical process. In some examples, mechanical process may includes an mechanical milling such as metal ball milling, ceramic (e.g. alumina, zirconia, silica, magnesia, etc.) ball milling, jet milling or hammer milling, or an mechanical crushing such as roll crushing, jaw crushing, etc.

Substrates, including solid substrates, may include metals including alloys, glass, ceramics including a silicon wafer for semiconductor, vinyl, masonry, concrete, natural stones, artificial stones, plastics, etc., but not limited thereto.

The shape of a substrate may include a specific shape such as a sphere, a cylinder, a polygon, a plate (including a plate shape like curve) or a tube, however, claimed subject matter is not limited in this regard. In other embodiment, a shape of a substrate may include an irregular shape.

In some embodiments, a substrate may have either a very uniform surface with nanometer scale, or an irregular surface having unevenness with micrometer scale.

Optionally, before coating a surface of a substrate with a dispersion liquid including silica particles, the surface of a substrate may be pre-treated by removing impurities (dusts, oil, moist, rust, foreign agents, etc.) present on a surface of a substrate. Then a base layer including silica particles may be formed on a surface of a substrate. Removing impurities may prevent weakening of desired characteristics such as adhesion between the substrate and the coating layer.

The silica particle dispersion liquid may be obtained by dispersing silica particles in a solvent such as water, alcohol (e.g. methanol, ethanol, propanol, buthanol, pentanol, octanol, etc.), or a mixture thereof. In other embodiment, other solvents, dispersant, etc. may be used to effectively disperse silica particles. In yet other embodiment, other substances may be used additionally to confer desired characteristics when applied on the surface of a substrate.

A base layer that includes silica particles may be formed by coating a surface of a substrate with a dispersion liquid containing solvent and silica particles, and evaporating/drying the solvent. The solvent may be evaporated/dried by subjecting the coated substrate at a temperature ranging from about room temperature to about 300° C. for a time period ranging from few seconds to few days.

In one embodiment, when a substrate is polymer plastic, silica particles may be fixed on surface of a plastic substrate by activating the surface using oxygen plasma (e.g. introducing polar functional group, etc.) and coating with silica particle dispersion liquid.

The dispersion liquid may be coated on a surface of a substrate by a known coating method. In some examples, coating methods may include dip coating, spray coating, bar coating, spin coating, brushing, roll coating, die coating, knife coating, etc. but not limited thereto.

A base layer may be formed on the entire surface of a substrate. In other embodiments, the base layer may be formed partially on some part of the surface. Although it is not formed entirely, it may be sufficient to improve adhesion of the additional coating layer on a surface of a substrate.

A base layer may be formed uniformly or unevenly on the surface of a substrate. In one embodiment, forming the base layer uniformly may denote that the base layer is formed with constant thickness at a nanometer scale. In other embodiment, forming the base layer unevenly may denote that the base layer is formed with uneven thickness at a micrometer scale microscopically. In yet other embodiment, forming the base layer unevenly may denote that a surface of a substrate has portions that are coated with silica particles, and those that are not coated with silica particles.

In some embodiments, the substrate on which a base layer is formed may be heat-treated. The temperature for heat-treatment may range from room temperature to a glass transition temperature of a silica particle. In one embodiment, the temperature may range from about 50° C. to about 900° C. In other embodiments, the temperature may range from about 100° C. to about 600° C., or about 200° C. to about 400° C. in yet other embodiments. The heat-treatment as above may allow the silica particles (or any other particles or substance) to be chemically bonded to the surface of the substrate so that the silica particles may be attached to the surface of the substrate more strongly.

In other embodiments, drying and heat-treating the substrate on which the dispersion liquid is coated may be performed at the same time in the above temperature ranges after coating the silica particle dispersion liquid on the surface of the substrate.

A thickness of a base layer including silica particles coated on the surface of the substrate may be controlled by changing the size of particles fixed on a surface of a substrate, the concentration of silica particles in a dispersion liquid, the number of times the substrate is coated with the dispersion liquid, etc. In some embodiments, varying the size of silica particles may increase roughness of a base layer, which can improve the adhesion of the silica particles to the substrate.

In one embodiment, a base layer formed on the surface of a substrate may be formed using a single layer having silica particles. In an illustrative embodiment, a thickness of a base layer may be at least the size of silica particle, at least about 40 nm, at least about 30 nm, or at least about 20 nm, for silica particles of 40 nm, 30 nm and 20 nm, respectively In other embodiments, a base layer formed on the surface of a substrate may include a multiple layer having silica particles. In one embodiment, the thickness of the base layer may be up to about 10 μm. In other embodiments, the base layer may have a thickness of up to about 5 μm, or up to about 1 μm in still other embodiments. When the base layer is thicker than the above ranges, a processing time may be increased uneconomically, and cracks may occur inside the thick base layer to decrease an adhesion of an additional coating layer to the base layer. The base layer including one or more layers having silica particles may be obtained by increasing the concentration of $SiO_2$ particles in dispersion liquid, or by repeating a coating step and a drying step one or more times, however, claimed subject matter is not limited in this regard.

In another embodiment, an additional coating layer may be formed by a coating material on a surface of a substrate including a base layer. Various coating materials may be employed in forming a coating layer and claimed subject matter is not limited to specific coating materials. In one embodiment, a coating material may comprise paint. Examples of paints may include a aqueous paint, anti-corrosive paint, oil-based paint, synthetic resin paint, enamel paint, lacquer, powder paint, vanish, primer, phenol resin paint, alkyd resin paint, amino alkyd resin paint, epoxy resin paint, vinyl resin paint, emulsion paint, polyester resin paint, polyurethane resin paint, water resin paint for metal, acryl resin paint, silicon paint, fluorine resin paint, spraying materials for construction, but not limited thereto.

Such a coating layer may be formed by a variety of methods known in the art including the coating methods mentioned above. If necessary, additional drying, heat-treating, etc. may be performed.

In comparison with conventional sol-gel coating having a flat surface, when a base layer including silica particles is formed on a surface of a substrate according to the methods disclosed herein, it may not only improve the roughness of the coated surface of the substrate, but also obtain a surface structure having a microstructure at a micrometer or nanometer scale. Thus, when an additional coating layer such as a paint layer, lacquer layer, etc. is formed on a surface of an article including a substrate and a base layer, it may increase a contact area between the components contained in coating layers and the base layer. In addition, it may improve the adhesion of the layer additionally coated to the surface of the substrate. Also, a surface of a substrate may have characteristics, which may be improved by the presence of the base layer. For example, these characteristics can include greater tolerance of mechanical, chemical, heat stresses, etc.; properties such as wear-resistance, scratch-resistance, corrosion-resistance, erosion-resistance, weather-resistance, etc. Also, in accordance with the methods disclosed herein a base layer including silica particles on the surface of substrate may be formed inexpensively, promptly and conveniently.

In one embodiment, method for forming a base layer do not use any acidic agents, unlike a conventional phosphating process using phosphoric acid, etc., which can be used for treating a surface of metal substrate. As such, when a substrate is a metal substrate, the surface may be treated without changing a chemical composition of the substrate. In addition, the method may be applied on all types of metal surfaces.

Examples described below are to further explain features and advantages of the subject matter of the present disclosure, but not limited to the examples presented below. The subject matter of the present disclosure should not be limited to the specific embodiments and examples described herein. In light of the present disclosure, a skilled artisan may easily perceive that it is possible to modify, substitute, add and combine a part of the constitutions disclosed in the present disclosure other than various exemplary embodiments and examples.

EXAMPLES

Preparation of Silica Particle 0.8 ml (3.6 mmol) of TEOS (tetraethyl orthosilicate), 1 ml of ammonia, and 1 ml of water were added into ethanol while stirring. After 4 hours, silica particles were formed by hydrolysis and polycondensation. Then, the solution containing silica particles was purified to obtain silica particles (150~200 mg) whose average particle size is about 50 nm.

Example 1

Figure 1:
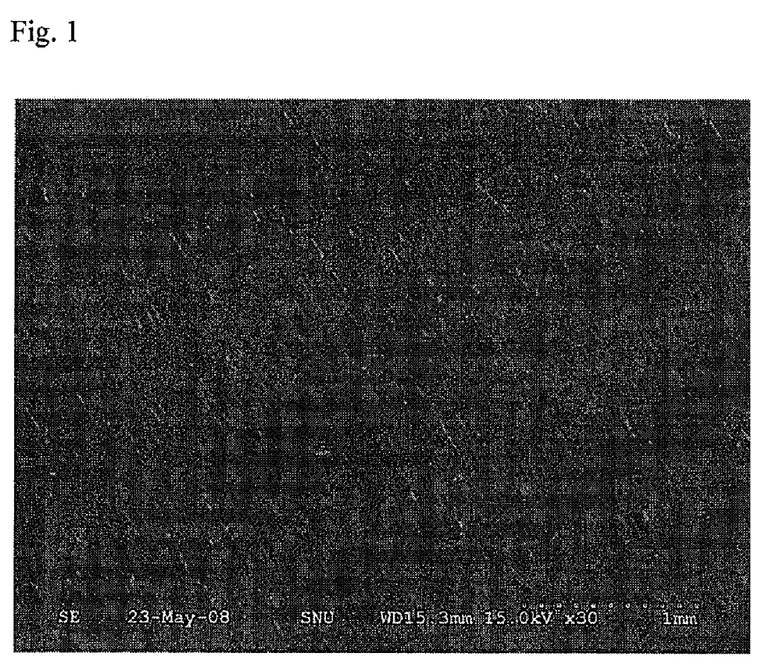
FIG. 1 shows an illustrative embodiment of an electron microscope image of a surface of aluminum plate with low magnification.
Figure 2:
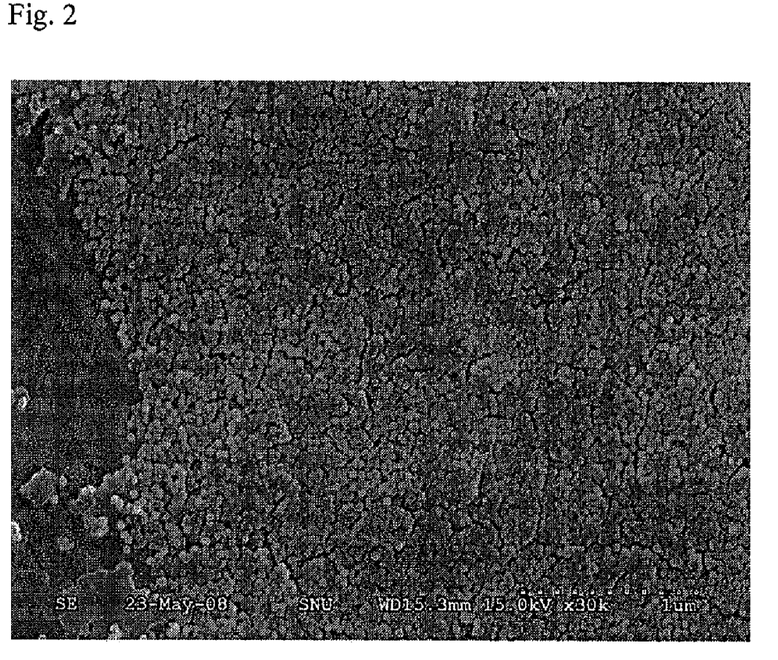
FIG. 2 shows an illustrative embodiment of an electron microscope image of a surface of aluminum plate with high magnification.

As prepared silica particles were dispersed in methanol or ethanol to obtain silica particle dispersion liquid. 2~3 ml of nanoparticle dispersion liquid was coated on a surface of commercially available aluminum metal plate (3×3 cm; with unevenness at micrometer scale) by a dip coating. After drying for 3 hours in room temperature, the aluminum plate on which the base layer including silica particles was formed may be obtained. FIG. 1 (low magnification) and FIG. 2 (high magnification) are images of electron microscope of the surface of aluminum plate obtained.

Example 2

Figure 3:
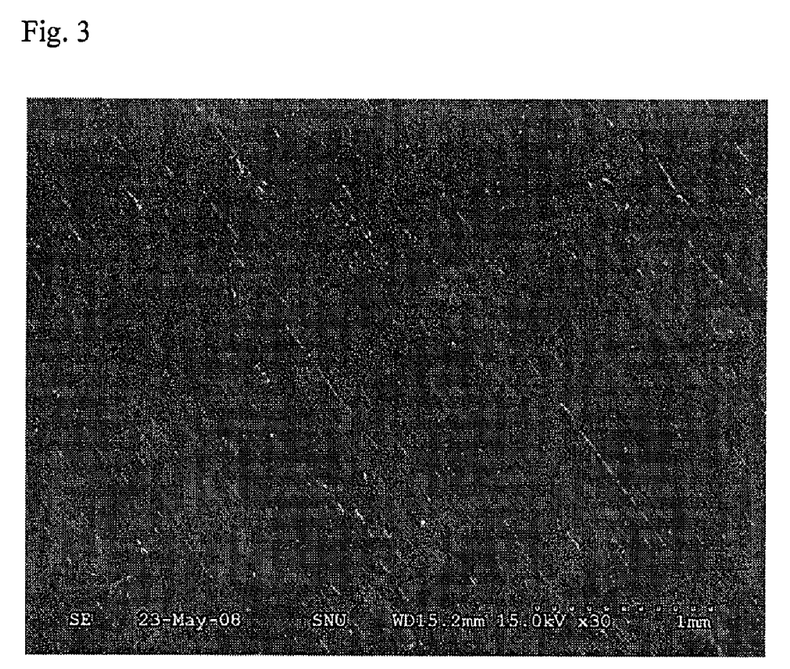
FIG. 3 shows another illustrative embodiment of an electron microscope image of a surface of silicon wafer with low magnification.
Figure 4:
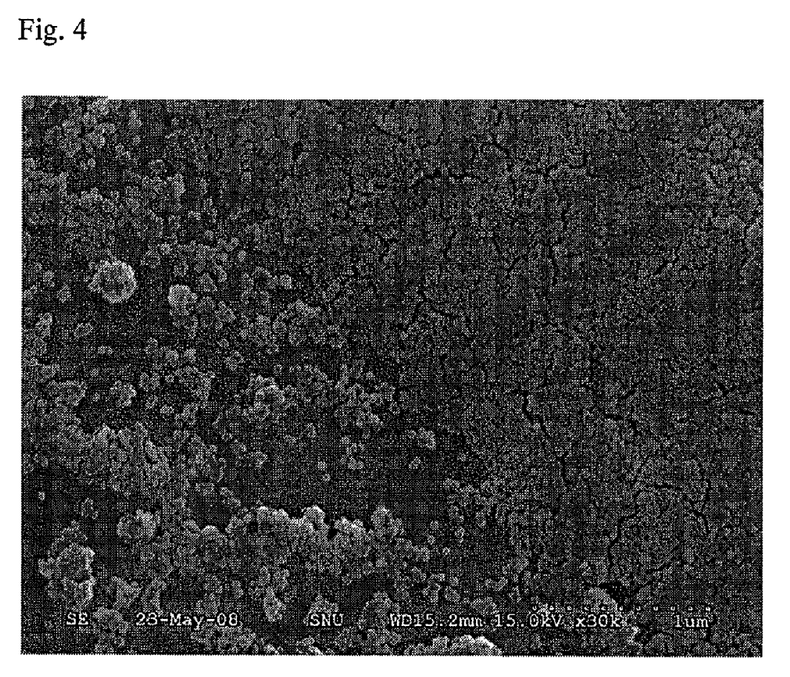
FIG. 4 shows another illustrative embodiment of an electron microscope image of a surface of silicon wafer with high magnification.

Except for using a commercially available silicon wafer for semiconductor (uniform at the nanometer scale) instead of the aluminum metal plate, the silicon wafer on which the base layer including silica particles was formed may be obtained by the similar method as in Example 1. FIG. 3 (low magnification) and FIG. 4 (high magnification) are images of electron microscope of the surface of silicon wafer obtained.

Example 3

Figure 5:
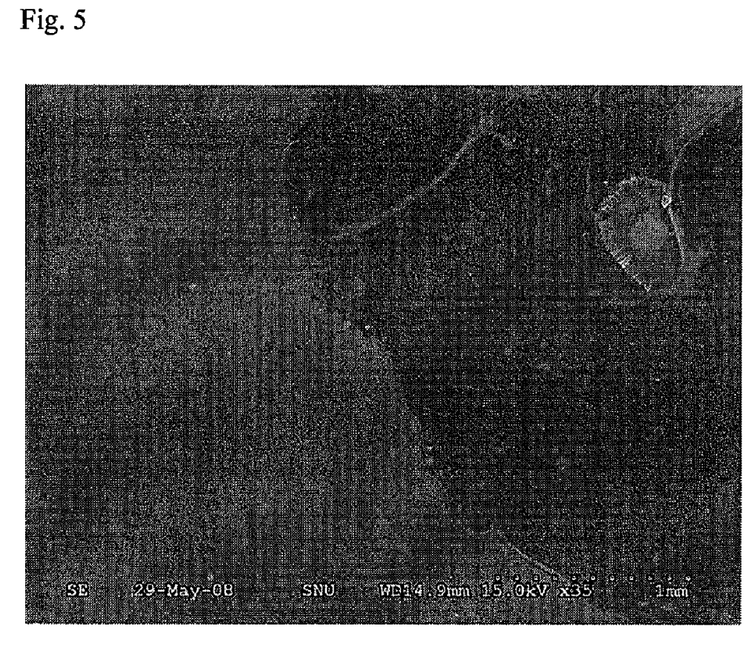
FIG. 5 shows still another illustrative embodiment of an electron microscope image of a surface of aluminum plate with low magnification.
Figure 6:
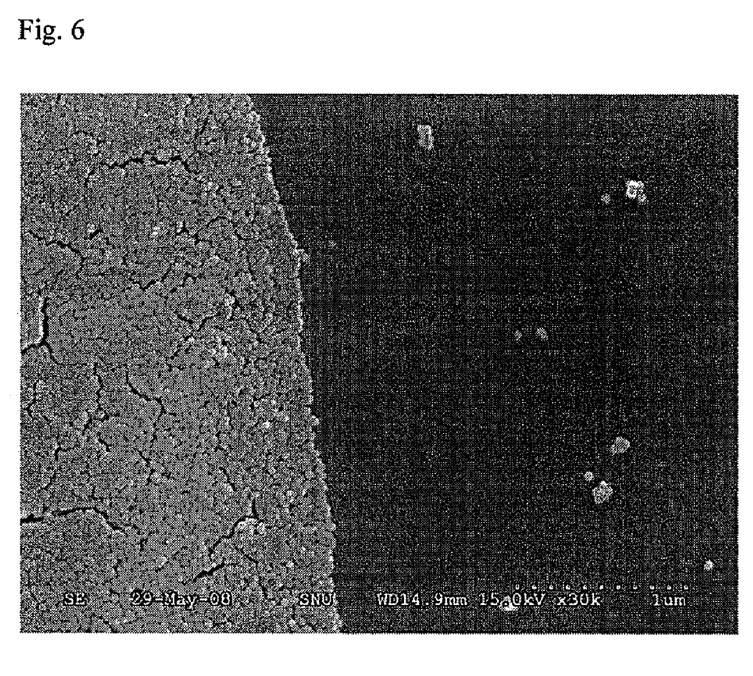
FIG. 6 shows still another illustrative embodiment of an electron microscope image of a surface of aluminum plate with high magnification.

The aluminum plate obtained according to Example 1 was heat-treated for about 3 hours at about 300° C. FIG. 5 (low magnification) and FIG. 6 (high magnification) are images of electron microscope of the surface of aluminum plate obtained.

Example 4

Figure 7:
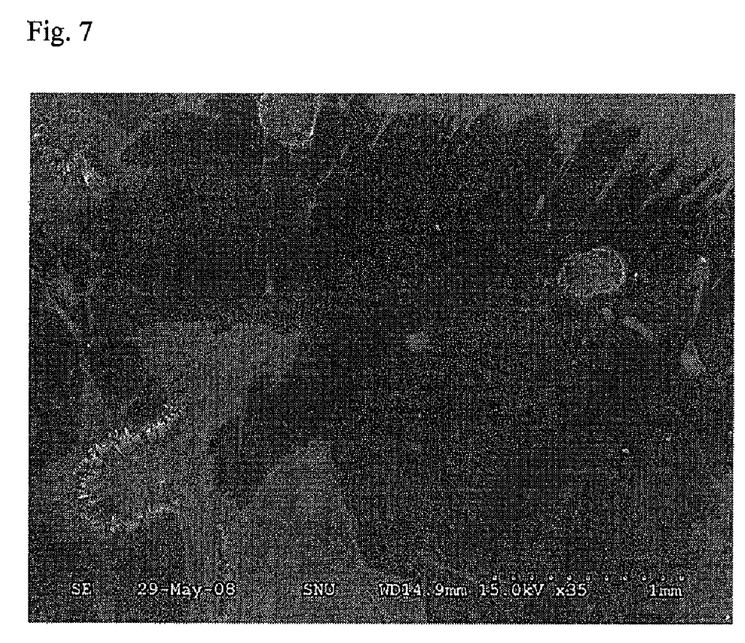
FIG. 7 shows a further illustrative embodiment of an electron microscope image of a surface of silicon wafer with low magnification.
Figure 8:
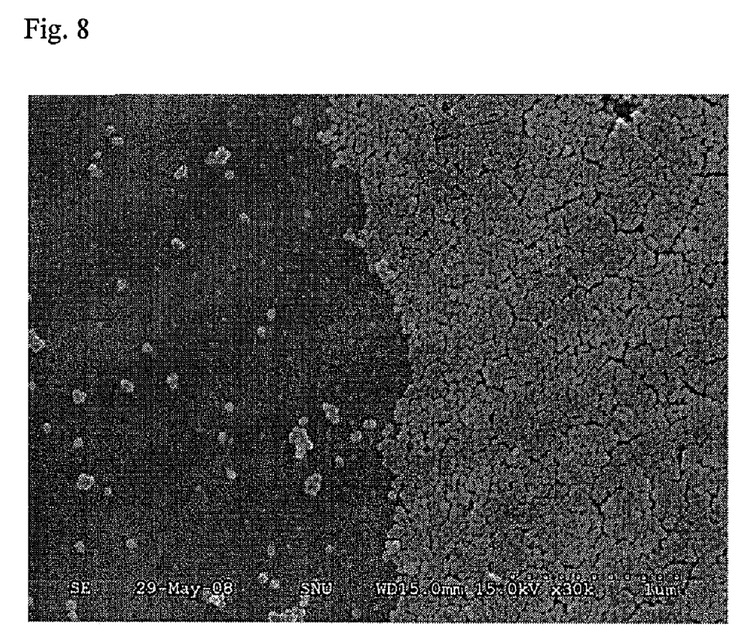
FIG. 8 shows a further illustrative embodiment of an electron microscope image of a surface of silicon wafer with high magnification.

The silicon wafer obtained according to Example 2 was heat-treated for about 3 hours at about 300° C. FIG. 7 (low magnification) and FIG. 8 (high magnification) are images of electron microscope of the surface of silicon wafer obtained.

Adhesive Property Test

Red lacquer was sprayed on the surfaces of the solid substrate according to Examples 1 to 4, and the surfaces of the aluminum plate (Comparative Example 1) and silicon wafer (Comparative Example 2) which are not coated with the base layer including silica particles. Above materials were dried for a day at room temperature to form a lacquer layer on the surface of the substrate.

In order to compare the adhesive property, tape was applied to the surface of a substrate. In this example, a green duct tape, which is commercially available from the Haesung Tape Industry Inc. (KR), was applied on a part of the surface of the substrate on which a lacquer layer was formed (the tape was attached on the left side of the dotted line). Whether the lacquer layer peeled off or not was confirmed.

Figure 9:
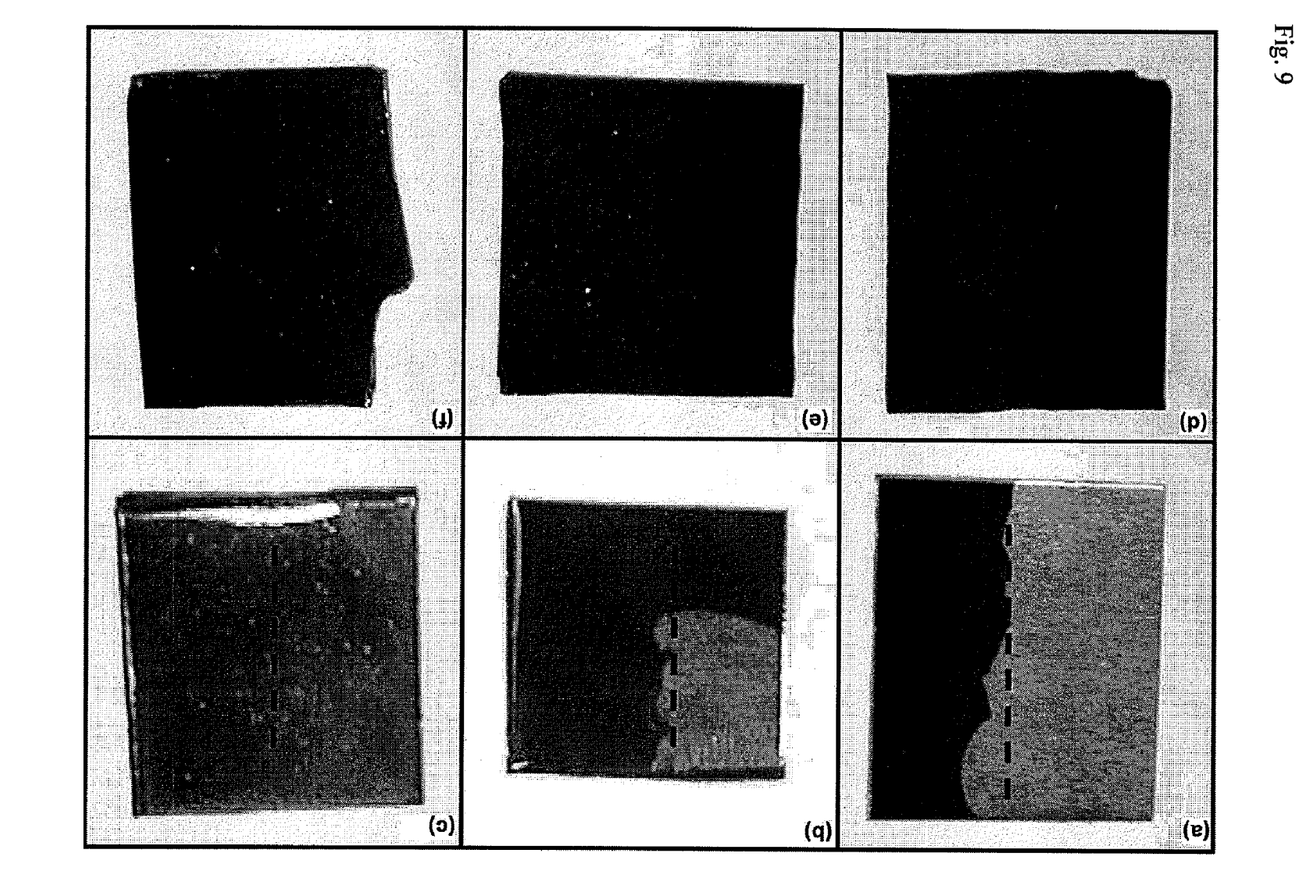
FIGS. 9(a)-9(f) are photographs showing adhesive property test results.

The result is indicated in FIG. 9. FIG. 9(a) is a photograph showing the test result of adhesive property according to Comparative Example 1; FIG. 9(b) is according to Example 1; FIG. 9(c) is according to Example 2; FIG. 9(d) is according to Comparative Example 2; FIG. 9(e) is according to Example 3; and FIG. 9(f) is according to Example 4.

It is shown from FIG. 9 that the adhesive property of Examples 1 to 4 (FIG. 9(b), 9(c), 9(e) and 9(f)), of which the surfaces were treated with silica particles, was better than that of Comparative Examples 1 (FIG. 9(a)) and 2 (FIG. 9(d)), of which the surfaces were not treated with silica particles. In particular, in case of heat-treating (Examples 3 and 4), the lacquer layer was not peeled off at all.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An article comprising:
    a substrate;
    a base layer formed on a surface of the substrate, wherein the base layer has a thickness less than 1 µm, and the base layer is heat-treated on the substrate at a temperature of about 200° C. to about 900° C.; and
    a coating layer formed on a surface of the base layer, wherein the base layer comprises silica particles, wherein an average size of the silica particles is about 20 nm to about 1 µm.

2. The article of claim 1, wherein the base layer improves an adhesive property of the surface of the substrate.

3. The article of claim 1, wherein the silica particles comprise porous particles.

4. The article of claim 1, wherein the base layer comprises silica particles with uniform sizes.

5. The article of claim 1, wherein about 95% or more of the total silica particles comprise sizes of about 40% to about 160% of a average particle size.

6. The article of claim 1, wherein the base layer comprises silica particles with different sizes.

7. The article of claim 1, wherein the less than about 95% of the total particles comprise sizes of about 40% to about 160% of a average particle size.

8. The article of claim 1, wherein the base layer comprises one or more layers comprising silica particles.

9. The article of claim 1, wherein the substrate comprises material selected from the group consisting of metals, glass, ceramics, vinyl, masonry, concrete, natural stones, artificial stones and plastics.

10. The article of claim 1, wherein the coating layer comprises paint.

11. The article of claim 1, wherein the base layer has a thickness of about 20 nm to about 500 nm.

12. The article of claim 1, wherein the substrate comprises a ceramic.

13. The article of claim 1, wherein the substrate is a silicon wafer.

14. The article of claim 1, wherein the substrate comprises a metal.

15. The article of claim 1, wherein the substrate comprises plasma-treated plastic.

16. The article of claim 1, wherein the substrate includes an irregular shape.

17. The article of claim 1, wherein the base layer is heat-treated on the substrate at a temperature of about 200° C. to about 400° C.

18. An article with improved adhesion characteristics comprising:
   a base layer comprising silica particles, wherein an average size of the silica particles is about 20 nm to about 1 μm;
   a substrate contacting one side of the base layer, wherein the substrate comprises a metal or a ceramic; and
   a coating layer contacting a side of the base layer opposite the substrate, wherein the coating layer comprises paint, wherein the base layer is heat-treated with the substrate at a temperature of about 200° C. to about 900° C.

19. The article of claim 1, wherein heat-treating the base layer on the substrate provides improved adhesion characteristics.

20. An article with improved adhesion characteristics comprising:
   a base layer consisting essentially of silica particles, wherein an average size of the silica particles is about 20 nm to about 1 μm;
   a substrate contacting one side of the base layer; and
   a coating layer contacting a side of the base layer opposite the substrate, wherein the coating layer comprises paint.

* * * * *

UNITED STATES PATENT AND TRADEMARK OFFICE
CERTIFICATE OF CORRECTION

| | | |
|---|---|---|
| PATENT NO. | : 8,153,249 B2 | Page 1 of 1 |
| APPLICATION NO. | : 12/198790 | |
| DATED | : April 10, 2012 | |
| INVENTOR(S) | : Lee | |

It is certified that error appears in the above-identified patent and that said Letters Patent is hereby corrected as shown below:

In Column 3, Line 7, delete "cruching," and insert -- crushing, --, therefor.

In Column 3, Line 31, delete "buthanol," and insert -- butanol, --, therefor.

In Column 4, Line 15, delete "buthanol," and insert -- butanol, --, therefor.

In Column 4, Line 35, delete "examples." and insert -- examples, --, therefor.

In Column 5, Line 17, delete "respectively" and insert -- respectively. --, therefor.

Signed and Sealed this
Twenty-ninth Day of May, 2012

David J. Kappos
*Director of the United States Patent and Trademark Office*